May 29, 1945. T. W. JONES 2,377,155
FLEXIBLE CONVEYER
Filed June 19, 1944 3 Sheets-Sheet 1

INVENTOR.
Taze W. Jones
BY Martin E. Anderson
ATTORNEY.

May 29, 1945.  T. W. JONES  2,377,155
FLEXIBLE CONVEYER
Filed June 19, 1944  3 Sheets-Sheet 2
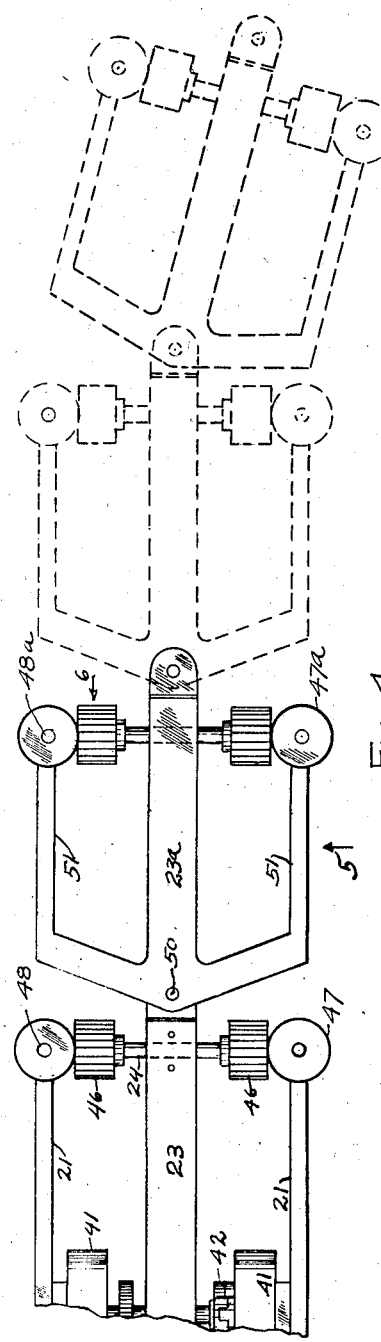
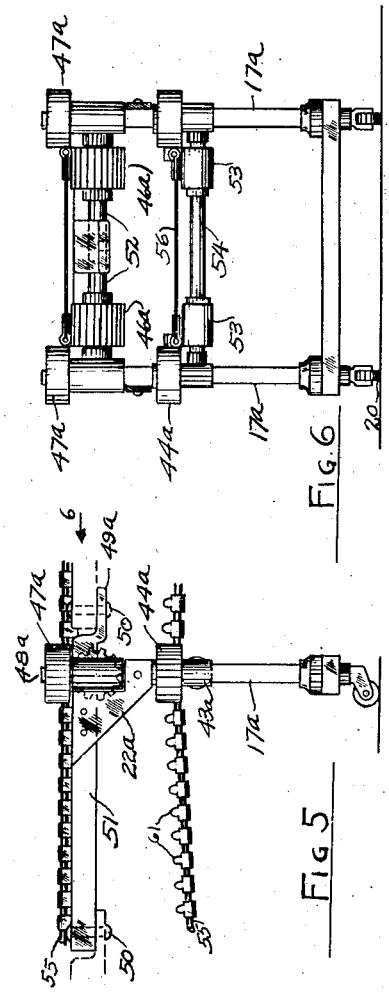
INVENTOR.
TAZE W. JONES
BY
Martin E. Anderson
ATTORNEY.

May 29, 1945. T. W. JONES 2,377,155
FLEXIBLE CONVEYER
Filed June 19, 1944 3 Sheets-Sheet 3

INVENTOR.
TAZE W. JONES
BY Martin E. Anderson
ATTORNEY.

Patented May 29, 1945

2,377,155

UNITED STATES PATENT OFFICE 2,377,155

FLEXIBLE CONVEYER

Taze W. Jones, Frederick, Colo.

Application June 19, 1944, Serial No. 540,932

4 Claims. (Cl. 198—109)

This invention relates to improvements in conveyers of the type employed in loading and unloading cars and trucks and for other similar purposes and which will be referred to hereinafter by the term of "flexible conveyer."

In handling freight, for example in unloading freight from cars onto trucks and from trucks into cars, a large amount of labor and time can be saved if the material can be loaded from the car directly onto a conveyer and transported by the latter to the truck or if the material is to be transferred from a truck into a freight car, it can likewise be transported by means of the same conveyer.

The need for such conveyers has been recognized and patents have been issued covering other types intended to perform the same or a similar function. It is the object of this invention to produce a flexible conveyer of a simple and substantial construction that can be manufactured at a comparatively small cost and which will be of a sturdy construction.

Another object of the invention is to produce a conveyer that is reversible and which can therefore be used for transporting freight in either of two directions without alteration except as to the direction in which the conveyer belt moves.

A still further object of this invention is to produce a conveyer having a conveyer belt that is nonelastic, but which is so constructed that the two sides thereof can shift longitudinally, thereby adapting the same for use with this or other flexible conveyers of this type.

A still further object of this invention is to produce a conveyer of the type specified in which there shall be one power unit for the entire conveyer and in which the other units, with the exception of the end one, are duplicates and which can therefore be constructed in any desired length by adding or subtracting support sections.

Having thus briefly described the invention, the same will now be described in detail and for this purpose reference will be had to the accompanying drawings in which the invention has been illustrated in its preferred form, and in which:

Figure 4 is a view showing by means of full lines, a portion of the power unit and a top plan view of one of the supporting units, other support units being indicated by broken lines;

Figure 5 is a side elevation looking in the direction of arrow 5, Figure 4;

Figure 6 is an end view of the supporting unit looking in the direction of arrow 6, Figure 5;

Figure 1:
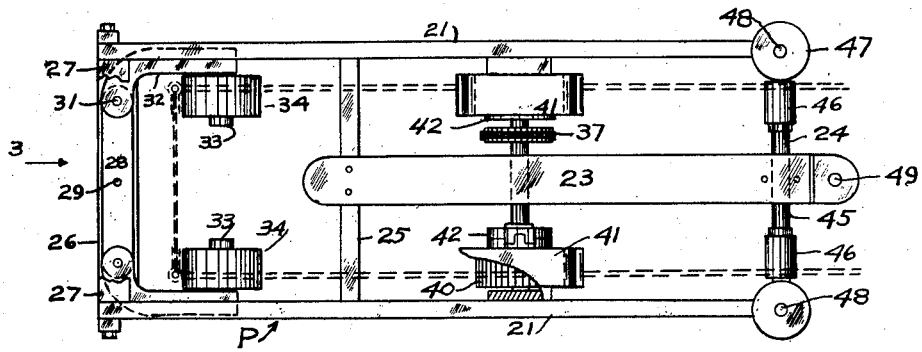
Figure 1 is a top plan view of the power unit, portions being broken away to better disclose the construction.
Figure 2:
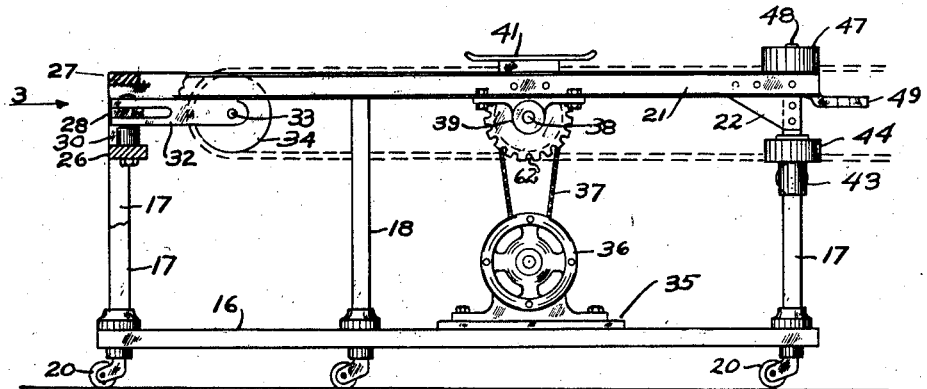
Figure 2 is a side elevation of the power unit shown in Figure 1, portions having been broken away to better disclose the construction.
Figure 3:
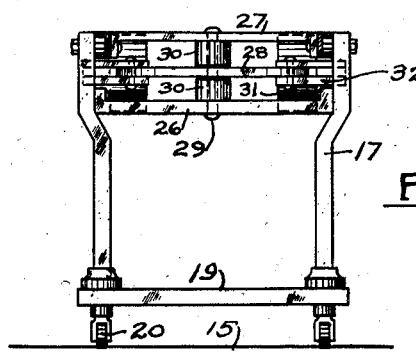
Figure 3 is an end elevation looking in the direction of arrows 3, in Figures 1 and 2.

In the drawings reference numeral 15 represents a surface on which the conveyer is supported. The power unit which has been illustrated in Figures 1 to 3, inclusive, comprises a rectangular frame 16 from the corners of which posts 17 project upwardly. Two additional posts 18 are positioned between the end posts as shown in Figure 2. The end posts are connected by transverse members 19 in the manner shown in Figure 3 and the entire assembly is supported on suitable castors which have been designated by reference numeral 20. Extending along the outside of the frame and forming a portion of the top thereof, are channel beams 21. These are secured to the corner posts 17 by gusset plates 22. A steel plate 23 projects from the upper transverse frame member 24 to the one indicated by reference numeral 25. Extending between the two corner posts at the left when viewed as in Figure 2, are two transverse bars which have been designated by reference numerals 26 and 27. A lever 28 is mounted on a pivot 29 that extends between the two transverse bars and is separated from the bars by spacers 30. Secured to the ends of lever 28, by means of pivots 31, are bracket arms 32 whose free ends are provided with journals 33 on which are mounted the rollers 34. It is evident that the two rollers 34 are adjustable in the direction of the length of the power frame and are constrained to move in opposite directions so that when one moves towards the right, the other will move an equal distance towards the left.

Supported on a base 35 is an electric motor 36 that transmits power by means of a belt or sprocket chain 37, to a drive shaft 38 that is journaled in bearings 39. This drive shaft carries two sprocket wheels 40 over which is positioned the guide plates 41. The two sprocket wheels are interconnected with the shaft by means of shaft couplings 42, only one of which has been shown, the other being partly hidden by the guide plate 41 at the top of the figure. By disconnecting the shaft couplings, the two sprocket wheels can be rotated relative to each other. Secured to the corner post at the right are suitable castings 43 that form vertical journals for the guide rollers 44. A shaft 45 extends transversely from the castings 44 and on this are journalled two supporting rollers 46. Guide rollers 47 are mounted for rotation on vertical pivots 48. Plate 23 extends towards the right and terminates in a tongue 49 which is perforated for the reception of a coupling bolt 50 shown more particularly in Figure 5.

Connected with the power unit that has just been described, are a plurality of supporting units which have been shown in detail in Figures 4, 5 and 6, and which consist of a frame having a flat, central plate 23a and parallel spaced supporting arms 51. Two legs 17a are secured to the outer ends of the arms 51 and connected with them by means of gusset plates 22a. Castings 43a are provided as in Figure 2 and on these are journalled the guide rollers 44a. Other guide rollers 47a are journalled on the vertical pivot 48a. The central plate terminates in a tongue 49a which is perforated for the bolt 50 by means of which another similar unit is coupled to the one just described. In Figure 4, two supporting units have been shown by broken lines and as many more can be provided as may be found necessary in order to get the length of conveyer desired. The upper ends of legs 17a are connected by means of a round shaft 52 on which are journalled the rollers or idler sprockets 46a. Supporting rollers 53 are provided on the transverse shaft 54, similar rollers being also provided between the corner post 17 at the left of the power unit illustrated in Figures 1 and 2.

Figure 7:
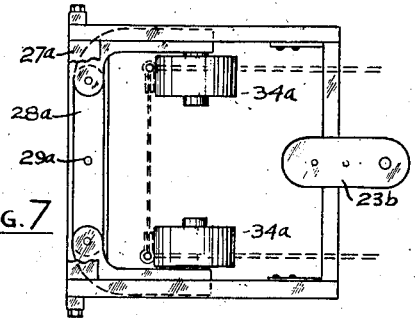
Figure 7 is a top plan view of a special support unit intended for use at one end of the conveyer.
Figure 10:
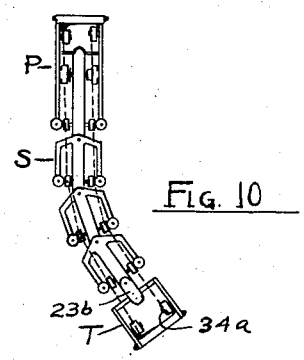
Figure 10 is a diagrammatic top plan view showing the assembled units forming a flexible conveyer.
Figure 8:
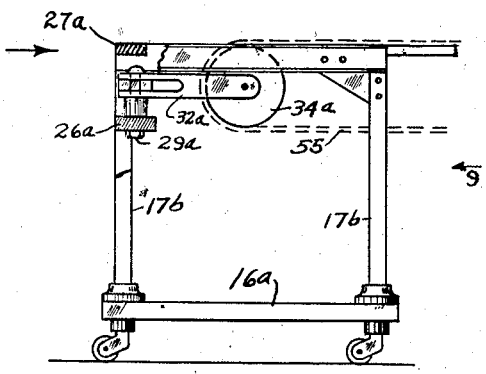
Figure 8 is a side elevation of the end unit shown in Figure 7.
Figure 9:
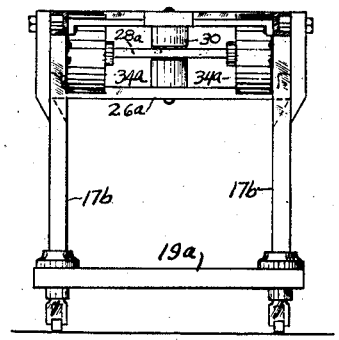
Figure 9 is an end elevation looking in the direction of arrow 9, Figure 8.

At the end of the assembly comprising the power unit and as many supporting units as may be desired, is a terminal unit that has been illustrated in Figures 7, 8 and 9 and which has been designated in Figure 10 by a reference character "T." This unit is provided with four corner posts 17b which are connected at their lower ends by frame members 16a and 19a. A short connector plate 23b extends from one end of the terminal frame and serves to effect the connection with the adjacent terminal unit. The terminal unit carries a pair of rollers 34a that is connected with the frame in exactly the same manner as rollers 34 are connected with the power frame. The elements corresponding to the elements in Figure 1 have been given the same reference numerals with the distinguishing letter "a" applied thereto.

It is now apparent that the power unit, which has been designated in its entirety by "P," and as many of the supporting units S as may be found necessary, together with a terminal unit T can be assembled in the manner indicated in Figure 10 and flexed either to the right or to the left.

Figure 11:
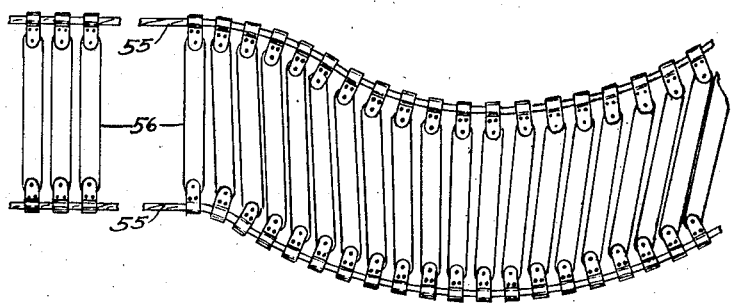
Figure 11 is a fragmentary top plan view of the conveyer belt showing the manner in which it can be flexed.
Figure 12:
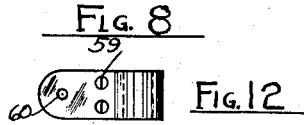
Figure 12 is a top plan view of one of the conveyer belt attaching elements.
Figures 13, 14:
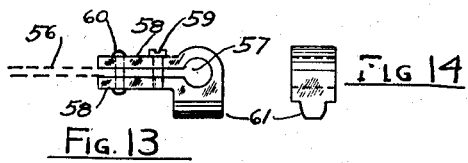
Figure 13 is a side elevation of the element shown in Figure 12.
Figure 14 is an end view thereof.

Having thus provided a frame for the conveyer belt and described the construction of the same, the conveyer belt will now be described in detail, and for this purpose reference will be had more particularly to Figure 11. The conveyer belt consists of two endless steel cables 55 that are held in spaced relation by means of a plurality of slats 56. These slats may be made from wood or from metal and are connected with the cables by means of clamps like those illustrated in Figures 12, 13 and 14. Each clamp comprises a casting having an opening 57 for the reception of the cable and projecting from the sides of this opening are two spaced arms or fingers 58. Screws or bolts 59 serve to clamp the member in position on the cable. After the clamping members are positioned, slats 56 are then positioned with their ends between the fingers 58 and are pivotally connected with the clamps by means of rivets 60 which form pivots. Each clamping member is provided on its lower surface with a gear tooth 61 that engages between the teeth 62 of the sprockets 40. When the conveyer chain is in position, as indicated by dotted lines in Figures 1 and 2, the teeth will be held from upward movement by the guides 41 and therefore when sprockets 40 are rotated by the motors, they will cause the conveyer chain to turn in the desired direction.

The bights of the cables 55 encircle the end rollers 34 and 34a at the ends of the assembly. When the conveyer is aligned so as to form a straight path, the rollers 34 are positioned as shown in Figure 1, but when the conveyer is turned to one side or the other, the cable along the outer edge of the conveyer belt is positioned in a curve having a greater radius of curvature than the cable on the inside and since the cables are practically inextensible, it follows that the two rollers 34 must adjust themselves angularly about the pivots 29 and 29a to compensate for the difference in lengths of the two parts. If we assume that a cable is connected to the middle points of the slats 56, this will not change in length, and since the cables 55 cannot change in length, the adjustment can be effected by the movement of the rollers 34 about the pivots and since these are anchored to the rocking lever by means of brackets pivoted substantially at the center line of the rollers, they will always maintain a position parallel with the cables, but will move somewhat closer together so as to always maintain the same relative position to the cables.

A conveyer like that described can be employed in many different positions, but when used for loading or unloading freight cars, the end carrying the terminal unit T can be positioned on the floor of the car and the power unit adjacent a truck, whereupon freight can be moved from the car to the truck. If a car is to be loaded, the direction of movement of the conveyer is reversed, thereby reversing the direction of travel.

When the conveyer is flexed, it is necessary to adjust the sprocket wheels 40 with respect to each other. This can be effected in several different ways, but the simplest way is believed to be that shown, in which the two sprockets 40 are connected with the shaft 38 by means of shaft couplings which have been indicated roughly in Figure 1. Since such shifting takes place only once for each setting, the shaft coupling can be operated by hand if desired. It is also permissible to substitute for this coupling, any other suitable means for clamping and releasing the sprockets 40 after and during each adjustment.

Particular attention is directed to the construction of the conveyer belt which makes it possible for it to operate around curves in the manner shown and described.

Having described the invention what is claimed as new is:

1. A flexible conveyer comprising, a power section and a plurality of pivotally interconnected supporting sections, one of which is pivotally connected with the power section, forming an elongated assembly that can be flexed horizontally about the pivots, a pair of rollers at each end of the assembly, one pair of rollers being connected with the power unit and the other with the end supporting section by an equalizing means that permits the rollers of each pair to move simultaneously and equidistantly in opposite directions, a conveyer belt encircling both pairs of rollers, said conveyer belt comprising two endless flexible members and slot elements pivotally connected therewith, means carried by the power unit, comprising a motor and a sprocket operatively interconnected with each other and with the endless members for moving the conveyer belt, and guide means on each supporting section adjacent the pivotal connection for engaging the edges of the conveyer belt to guide it at the points of flexure.

2. A flexible conveyer comprising, a power section, and a plurality of pivotally interconnected supporting sections, one of which is pivotally connected with the power section, forming an elongated assembly that can be flexed horizontally about the pivots, a pair of rollers connected with one end of the power section, equalizing means interconnecting the rollers for effecting a simultaneous and equal adjustment in opposite directions, a pair of rollers connected with the free end of the last pivoted section, an equalizing means interconnecting the latter pair of rollers for simultaneous and equal adjustments in opposite directions, a conveyer belt encircling both pairs of rollers, the belt comprising two spaced endless tension members interconnected for relative shifting in the direction of their lengths, transversely extending interconnecting members pivotally connected at their ends to the tension members, a motor carried by the power section, means driven by the motor and operatively engaging the tension members, for driving the conveyer belt, and a guide means on each pivoted section adjacent one end thereof for engaging the concave edge of the conveyer belt at each point of flexure.

3. A flexible conveyer comprising, a power section and a plurality of pivotally interconnected supporting sections, one of which is pivotally connected with the power section, forming an elongated assembly that can be flexed about the pivots, a pair of rollers on each end of the assembly, each pair of rollers being connected with the adjacent end unit by an equalizing means that permits the rollers of each pair to move simultaneously and equidistantly in opposite directions, a conveyer belt encircling both pairs of rollers, said conveyer belt comprising two endless flexible members and slat elements having their ends pivotally connected therewith, means carried by the power unit, comprising a motor and a sprocket operatively interconnected with each other and with the endless flexible members, for moving the conveyer belt, guide means on each supporting section adjacent the pivotal connection for engaging the edges of the conveyer belt to guide it at the points of flexure, and means for supporting and guiding the under section of the conveyer belt.

4. A flexible support for a flexible conveyer belt, comprising a power unit having four supporting legs, the unit being of greater length than width, a pair of spaced rollers operatively connected with one end, means for effecting an equal and simultaneous movement of the rollers in opposite directions of the length of the frame, the other end having a hinge element, a supporting unit comprising a frame having two supporting legs at one end, the other end being provided with a hinge element for cooperative connection with the hinge element of the power unit, a plurality of similar support units connected with each other forming a row, one end unit of which is pivoted to the first mentioned support unit, the free end of the last support unit having a pair of spaced rollers operatively connected therewith for simultaneous and equal adjustment in opposite directions, a conveyer belt encircling both pair of rollers, and means comprising a motor and a motion transmission mechanism for driving the conveyer.

TAZE W. JONES.